US012667886B2

(12) United States Patent
Tomohiro et al.

(10) Patent No.: US 12,667,886 B2
(45) Date of Patent: Jun. 30, 2026

(54) METHOD OF MANUFACTURING A COIL COMPONENT

(71) Applicant: Murata Manufacturing Co., Ltd., Kyoto-fu (JP)

(72) Inventors: Takashi Tomohiro, Nagaokakyo (JP); Noriko Shimizu, Nagaokakyo (JP); Kenichi Araki, Nagaokakyo (JP); Eiji Iso, Tsurugashima (JP); Keita Muneuchi, Tsurugashima (JP); Isao Ida, Tsurugashima (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 636 days.

(21) Appl. No.: 18/169,123

(22) Filed: Feb. 14, 2023

(65) Prior Publication Data

US 2023/0191484 A1 Jun. 22, 2023

Related U.S. Application Data

(60) Division of application No. 15/967,062, filed on Apr. 30, 2018, now Pat. No. 11,615,903, which is a (Continued)

(30) Foreign Application Priority Data

Feb. 1, 2016 (JP) ................................ 2016-017043

(51) Int. Cl.
*H01F 7/06* (2006.01)
*B22F 1/102* (2022.01)
(Continued)

(52) U.S. Cl.
CPC ................ *B22F 3/24* (2013.01); *B22F 1/102* (2022.01); *B22F 1/16* (2022.01); *H01F 1/14733* (2013.01);
(Continued)

(58) Field of Classification Search
CPC ........ H01F 1/10; H01F 1/102; H01F 1/14733; H01F 1/14766; H01F 1/16; H01F 1/20;
(Continued)

(56) References Cited

U.S. PATENT DOCUMENTS 4,818,562 A 4/1989 Arcella et al.
5,745,834 A 4/1998 Bampton et al.
(Continued)

FOREIGN PATENT DOCUMENTS

JP 2001-155950 A 6/2001
JP 2013-098281 A 5/2013
(Continued)

OTHER PUBLICATIONS

An Office Action issued by the State Intellectual Property Office of the People's Republic of China on Apr. 27, 2020, which corresponds to Chinese Patent Application No. 201780009318.8 and is related to U.S. Appl. No. 15/967,062.

(Continued)

*Primary Examiner* — Paul D Kim
(74) *Attorney, Agent, or Firm* — Studebaker Brackett PLLC

(57) ABSTRACT

A coil component includes a body that is made of a composite material containing a resin material and metal powder, a coil conductor which is provided in the body and an end portion of which is exposed on an end face of the body, and a metal film that is provided on an outer surface of the body and that is electrically connected to the coil conductor on the end face in the outer surface. The outer surface of the body has a contact area that is in contact with the metal film. Multiple particles of the metal powder escape from the resin material and are in contact with each other in the contact area of the body.

3 Claims, 8 Drawing Sheets

Related U.S. Application Data continuation of application No. PCT/JP2017/001788, filed on Jan. 19, 2017.

(51) Int. Cl.

| | |
|---|---|
| ***B22F 1/16*** | (2022.01) |
| ***B22F 3/24*** | (2006.01) |
| ***H01F 1/147*** | (2006.01) |
| ***H01F 1/20*** | (2006.01) |
| ***H01F 1/22*** | (2006.01) |
| ***H01F 17/04*** | (2006.01) |
| ***H01F 27/255*** | (2006.01) |
| ***H01F 27/29*** | (2006.01) |
| ***H01F 41/10*** | (2006.01) |

(52) U.S. Cl.

CPC ........... *H01F 1/14766* (2013.01); *H01F 1/20* (2013.01); *H01F 1/22* (2013.01); *H01F 17/04* (2013.01); *H01F 27/255* (2013.01); *H01F 27/292* (2013.01); *H01F 41/10* (2013.01); *B22F 2998/10* (2013.01); *B22F 2999/00* (2013.01); *C22C 2202/02* (2013.01); *H01F 2017/048* (2013.01)

(58) Field of Classification Search

CPC ........ H01F 1/22; H01F 27/255; H01F 27/292; H01F 17/04; H01F 41/10; H01F 2017/048; B22F 3/24; B22F 2999/00; B22F 2998/10; B22F 2003/248; B22F 2202/01; C22C 32/0094; C22C 2202/02

See application file for complete search history.

(56) References Cited

U.S. PATENT DOCUMENTS

| | | | | |
|---|---|---|---|---|
| 11,170,935 | B2 * | 11/2021 | Iso | H01F 41/041 |
| 11,476,037 | B2 * | 10/2022 | Kim | H01F 27/2804 |
| 11,538,616 | B2 * | 12/2022 | Kim | H01F 27/255 |
| 2002/0053967 | A1 | 5/2002 | Shikama et al. | |
| 2012/0274429 | A1 | 11/2012 | Ogawa et al. | |
| 2014/0132383 | A1 | 5/2014 | Matsuura et al. | |
| 2014/0145814 | A1 | 5/2014 | Lee et al. | |
| 2015/0201500 | A1 * | 7/2015 | Shinar | B29C 64/112 425/132 |
| 2016/0012961 | A1 | 1/2016 | Suzuki et al. | |
| 2016/0035476 | A1 | 2/2016 | Mimura et al. | |
| 2016/0155550 | A1 | 6/2016 | Ohkubo et al. | |
| 2016/0180995 | A1 | 6/2016 | Park et al. | |
| 2017/0084385 | A1 | 3/2017 | Ida | |

FOREIGN PATENT DOCUMENTS

| | | | |
|---|---|---|---|
| JP | 2014-225590 | A | 12/2014 |
| JP | 2015-065284 | A | 4/2015 |
| JP | 2016-004814 | A | 1/2016 |

OTHER PUBLICATIONS

International Search Report issued in PCT/JP2017/001788; mailed Mar. 21, 2017.

Written Opinion issued in PCT/JP2017/001788; mailed Mar. 21, 2017.

* cited by examiner

NOT IRRADIATED WITH LASER

5W/mm$^2$

12W/mm2

METHOD OF MANUFACTURING A COIL COMPONENT

CROSS-REFERENCE TO RELATED APPLICATION

This application is a Divisional of U.S. patent application Ser. No. 15/967,062 filed Apr. 30, 2018, now U.S. Pat. No. 11,615,903, which claims benefit of priority to International Patent Application No. PCT/JP2017/001788, filed Jan. 19, 2017, and to Japanese Patent Application No. 2016-017043, filed Feb. 1, 2016, the entire contents of each are incorporated herein by reference.

BACKGROUND

Technical Field

The present disclosure relates to a coil component and a method of manufacturing the coil component.

Background Art

A coil component in related art is described in Japanese Unexamined Patent Application Publication No. 2013-98281. This coil component includes a body, a coil conductor provided in the body, and an outer electrode that is provided on the body and that is electrically connected to the coil conductor. The outer electrode has an end-face electrode provided on an end face of the body, a bottom-face electrode provided on the bottom face of the body, and a conductor which is embedded in the body and with which the end-face electrode is connected to the bottom-face electrode.

SUMMARY

Since the conductor is embedded in the body in the coil component in the related art described above, the body may be decreased in size by an amount corresponding to the conductor to reduce the efficiency of inductance. Accordingly, as a result of careful consideration, the inventor of the present application proposes the present disclosure in order to improve the efficiency of acquisition of the inductance by focusing on use of metal powder in a coil component including a body containing the metal powder. A challenge of the present disclosure is to provide a coil component having improved efficiency of acquisition of the inductance.

In order to resolve the above problem, the present disclosure provides a coil component including a body that is made of a composite material containing a resin material and metal powder, a coil conductor which is provided in the body and an end portion of which is exposed on an end face of the body, and a metal film that is provided on an outer surface of the body and that is electrically connected to the coil conductor on the end face in the outer surface. The outer surface of the body has a contact area that is in contact with the metal film. Multiple particles of the metal powder escape from the resin material and are in contact with each other in the contact area of the body.

The exposure here means not only exposure of the coil component to the outside but also exposure of the coil component to another member, that is, exposure of the coil component on the boundary face with the other member. In other words, the multiple particles are not necessarily exposed to the atmosphere and may be covered with the metal film while escaping from the resin material.

With the coil component of the present disclosure, since the metal film is in contact with the contact area on the outer surface of the body, the metal film is not embedded in the body and the body is increased in size by an amount corresponding to the metal film to improve the efficiency of acquisition of inductance. In addition, since the metal powder escapes from the resin material and at least partial portions of the escaping metal powder are in contact with each other, at least partial portions of the escaping metal powder have a network structure having connectivity. Accordingly, in formation of the metal film through the direct plating on the body, current is easy to flow because of the network structure of the metal powder and the precipitation speed of the plating is increased to facilitate the formation of the metal film.

In an embodiment of the coil component, the particles are bonded to each other through melting. According to the above embodiment, at least partial portions of the metal powder, which are in contact with each other, are bonded to each other through, for example, the melting. Accordingly, the network structure of the metal powder is made strong to further facilitate the formation of the metal film.

In an embodiment of the coil component, the outer surface of the body has a side face adjacent to the end face, the contact area is provided on the end face and part of the side face, and the metal film is continuously provided on the end face and part of the side face. According to the above embodiment, the metal film is continuously provided on the end face and part of the side face. It is not necessary to embed the conductor for conducting to a bottom face in the body and it is possible to form the metal film in, for example, an L shape while improving the efficiency of acquisition of the inductance.

In an embodiment of the coil component, the coil component includes an insulating film that covers a portion of the metal film, which is positioned on the end face. According to the above embodiment, since the coil component includes the insulating film that covers the portion of the metal film, which is positioned on the end face, only the portion of the metal film, which is positioned on the side face, is capable of being exposed to the outside. The L-shaped metal film is capable of being changed to the planar metal film (the bottom electrode) with a simple configuration in the above manner. In addition, since the insulating film is provided on the end face side of the coil component. Accordingly, even when multiple coil components are disposed so as to be close to each other, the adjacent coil components are less likely to be short-circuited.

The present disclosure provides a method of manufacturing a coil component including a step of providing a coil conductor in a body made of a composite material containing a resin material and metal powder so that an end portion of the coil conductor is exposed on an end face of the body, and a laser irradiating step of irradiating at least the end face in an outer surface of the body with laser and causing multiple particles of the metal powder to escape from the resin material on a laser irradiation face of the body to cause the particles to be in contact with each other. The method further includes a metal film forming step of forming a metal film on the laser irradiation face of the body using plating.

With the method of manufacturing the coil component of the present disclosure, it is possible to easily form the metal film using the plating by irradiating the body with the laser so that the particles of the metal powder are exposed on the body and are in contact with each other. Accordingly, it is not necessary to embed the conductor conducting to the bottom electrode in the body and the body is capable of being increased in size by an amount corresponding to conductor to improve the efficiency of acquisition of the inductance.

The metal film is easily formed on the body because of the following reasons. The outer surface of the body is irradiated with the laser to cause the metal powder to escape from the resin material, and at least partial portions of the escaping metal powder are caused to be in contact with each other. In this case, at least partial portions of the escaping metal powder have the network structure having the connectivity. Accordingly, in the formation of the metal film through the direct plating on the body, current is easy to flow because of the network structure of the metal powder and the precipitation speed of the plating is increased to facilitate the formation of the metal film.

In an embodiment of the coil component, the body has the end face and a side face adjacent to the end face, the laser irradiation face is provided on the end face and the side face in the laser irradiating step, and the metal film is continuously provided on the end face and the side face in the metal film forming step. According to the above embodiment, the metal film is continuously provided on the end face and the side face in the metal film forming step. It is possible to form the metal film in, for example, an L shape without embedding the metal film in the body to improve the efficiency of acquisition of the inductance.

In an embodiment of the coil component, the method of manufacturing the coil component includes an insulating film forming step of covering a portion of the metal film, which is positioned on the end face, with an insulating film after the metal film forming step. According to the above embodiment, since the portion of the metal film, which is positioned on the end face, is covered with the insulating film, only the portion of the metal film, which is positioned on the first side face, is exposed to the outside. The L-shaped metal film is capable of being changed to the planar metal film (the bottom electrode) with a simple configuration in the above manner. In addition, since the insulating film is provided on the end face side of the coil component. Accordingly, even when multiple coil components are disposed so as to be close to each other, the adjacent coil components are not short-circuited.

According to the coil component of the present disclosure, it is possible to easily form the electrode of an arbitrary shape without embedding the conductor conducting to the bottom electrode in the body and to increase the body in size by an amount corresponding to the conductor, thus improving the efficiency of acquisition of the inductance.

DETAILED DESCRIPTION

Embodiments of the present disclosure will herein be described in detail with reference to the drawings.

First Embodiment

Figure 1:
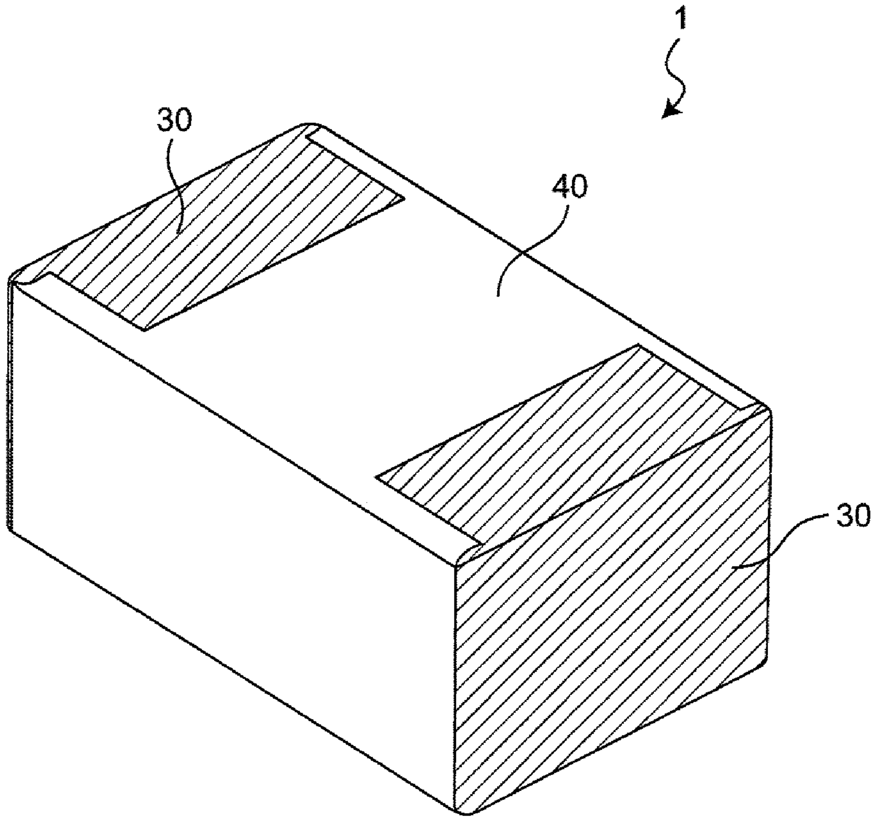
FIG. 1 is a perspective view illustrating a first embodiment of a coil component of the present disclosure.
Figure 2:
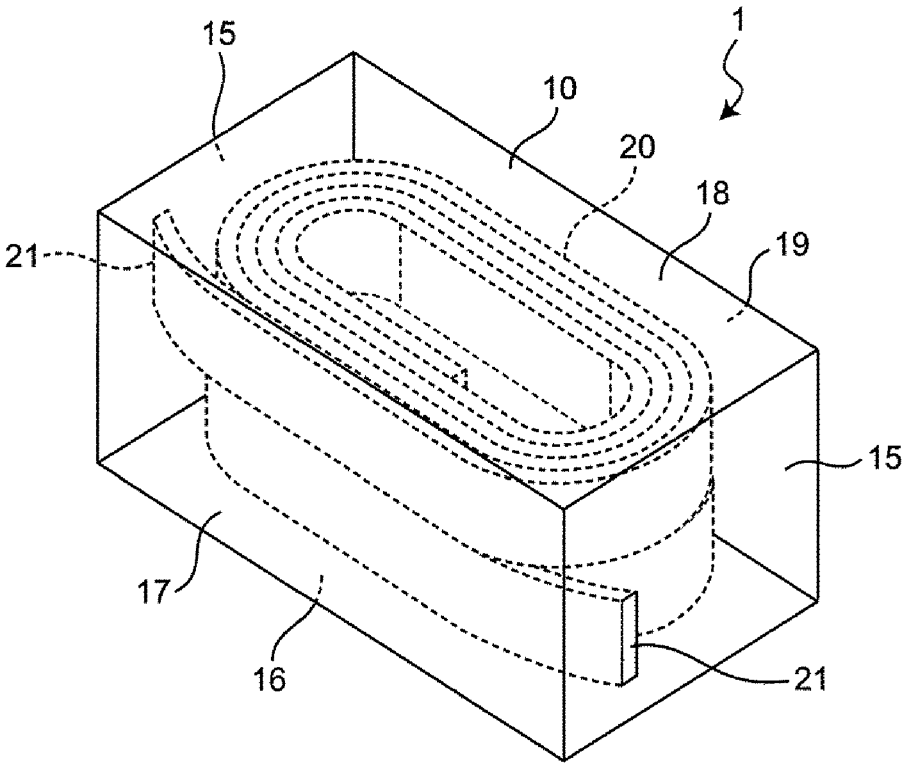
FIG. 2 is a perspective view in which part of the components of the coil component is omitted.
Figure 3:
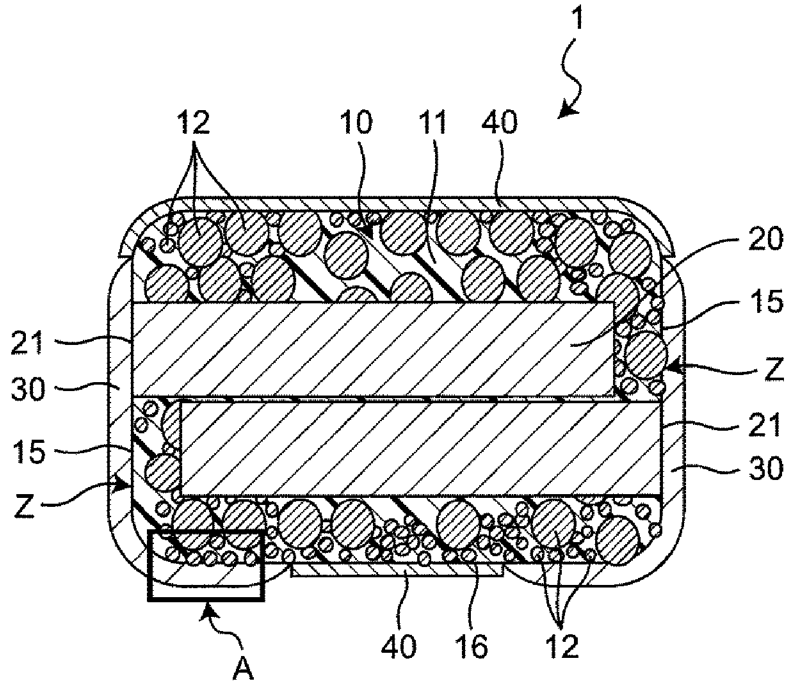
FIG. 3 is a cross-sectional view of the coil component.

FIG. 1 is a perspective view illustrating a first embodiment of a coil component of the present disclosure. FIG. 2 is a perspective view in which part of the components of the coil component is omitted. FIG. 3 is a cross-sectional view of the coil component. As illustrated in FIG. 1, FIG. 2, and FIG. 3, a coil component 1 includes a body 10, a coil conductor 20 provided in the body 10, outer electrodes 30 that are provided on the outer surface of the body 10 and that are electrically connected to the coil conductor 20, and an insulating film 40 provided on the outer surface of the body 10. The outer electrodes 30 are hatched in FIG. 1.

The body 10 is made of a composite material containing a resin material 11 and metal powder 12. The resin material 11 is, for example, an organic material, such as polyimide resin or epoxy resin. The metal powder 12 may be Fe powder or an alloy, such as FeSiCr, which contains Fe. The metal powder 12 may contain both Fe powder and the alloy powder containing Fe. The metal powder 12 may contain at least one of metals: Pd, Ag, and Cu, in addition to the Fe power or the alloy powder containing Fe. At least one of the metals: Pd, Ag, and Cu functions as plating catalyst that improves the growth rate of plating in the plating of the body. Accordingly, when the metal powder 12 contains at least one of the metals: Pd, Ag, and Cu, the growth rate of the plating is capable of being increased. The metal powder 12 may be crystal metal (or alloy) powder or amorphous metal (or alloy) powder. The surface of the metal powder 12 may be covered with the insulating film.

The body 10 is formed in, for example, a rectangular parallelepiped. The body 10 has both end faces 15, 15 opposed to each other and first to fourth side faces 16 to 19 between the both end face 15, 15. The first to fourth side faces 16 to 19 are sequentially arranged in a circumferential direction. The first side face 16 serves as a mounting face when the electronic component 1 is mounted. The third side face 18 is opposed to the first side face 16. The second side face 17 and the fourth side face 19 are opposed to each other.

The coil conductor 20 contains a conductive material, such as Au, Ag, Cu, Pd, or Ni. The surface of the conductive material may be covered with an insulating film. The coil conductor 20 is formed through winding in a spiral shape in two steps so that both end portions 21, 21 of the coil conductor 20 are positioned on an outer periphery. In other words, the coil conductor 20 is formed by winding a rectangular lead wire outward. One end portion 21 of the coil conductor 20 is exposed on one end face 15 of the body 10, and the other end portion 21 of the coil conductor 20 is exposed on the other end face 15 of the body 10. However, the shape of the coil conductor 20 is not specifically limited and how the coil conductor 20 is wound is not specifically limited.

The outer electrodes 30 are a metal film provided on the outer surface of the body 10 and are a film formed using the plating. The metal film is made of a metal material, such as Au, Ag, Pd, Ni, or Cu. The outer electrodes 30 may have a layered structure in which the surface of the metal film is further covered with another plating film. The outer electrodes 30 are described so as to be formed of a single layer of the metal film.

In the present embodiment, the outer electrodes 30 are provided on the both end faces 15 of the body 10. Specifically, one outer electrode 30 is continuously provided on one end face 15 and one end face 15 side of the side face 16 (hereinafter also referred to as the first side face 16). The other outer electrode 30 is continuously provided on the other end face 15 and the other end face 15 side of the first side face 16. In other words, each outer electrode 30 is formed in an L shape. One outer electrode 30 is electrically connected to one end portion 21 of the coil conductor 20, and the other outer electrode 30 is electrically connected to the other end portion 21 of the coil conductor 20.

The insulating film 40 is provided on the outer surface of the body 10 in portions where the outer electrodes 30 are not disposed. Specifically, the coil component includes the metal film 10 provided on part of the outer surface of the body 10 and the insulating film 40 provided on the remaining portion of the outer surface. Since the coil component includes the insulating film in the portions where the metal film is not formed on the outer surface, as described above, it is possible to inhibit the plating from growing to a size over a contact area in the plating. In other words, the metal film 10 is capable of being selectively formed by using the insulating film 40 as a mask. The insulating film and the metal film may be partially overlapped with each other. For example, the metal film 30 may be formed on the insulating film 40. The insulating film 40 is made of a resin material having high electrical insulation, such as acrylic resin, epoxy resin, or polyimide.

Figure 4:
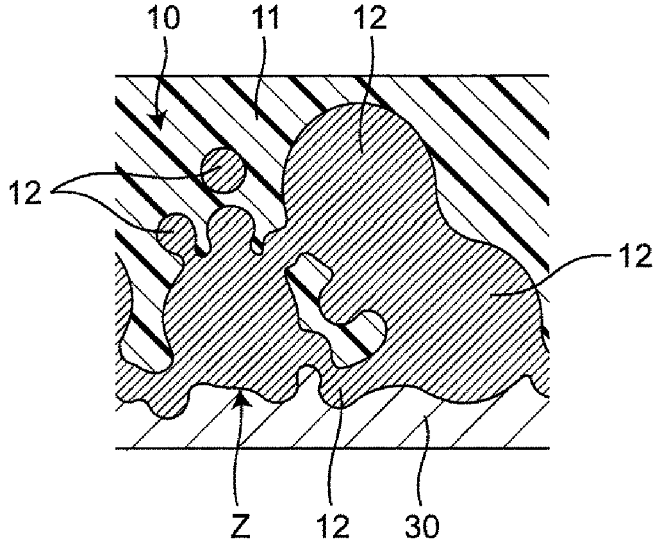
FIG. 4 is an enlarged view of an A portion in FIG. 3.
Figure 5:
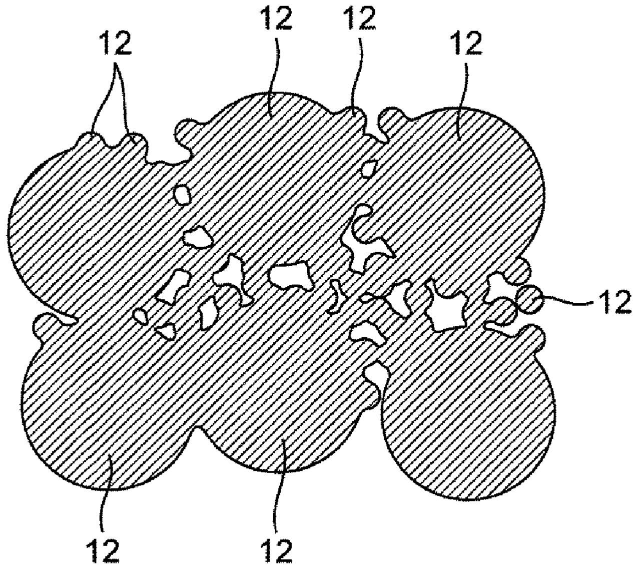
FIG. 5 is a plan view of metal powder on an outer surface of a body.

FIG. 4 is an enlarged view of an A portion in FIG. 3. FIG. 5 is a plan view of the metal powder on the outer surface of the body 10. As illustrated in FIG. 3, FIG. 4, and FIG. 5, the outer surface of the body 10 has contact areas Z that are in contact with the outer electrodes 30. The metal powder 12 escapes from the resin material 11 in the contact areas Z of the body 10. The exposure here means not only exposure of the coil component 1 to the outside but also exposure of the coil component 1 to another member, that is, exposure of the coil component 1 on the boundary face with the other member.

At least partial portions (also referred to as particles) of the escaping metal powder 12 are in contact with each other. In other words, the particles of the metal powder 12 have a network structure having connectivity. In addition, at least partial portions of the metal powder 12, which are in contact with each other, are bonded to each other. Specifically, the particles of the metal powder 12 are bonded to each other through, for example, melting.

The network structure of the metal powder 12 is formed by, for example, irradiating the outer surface of the body 10 with laser. Specifically, the resin material 11 on the outer surface of the body 10 is removed with the laser to cause the particles of the metal powder 12 to be in contact with each other while causing the metal powder 12 to escape from the resin material 11. Then, the metal powder 12 is melted with the laser to cause the particles of the metal powder 12 to be bonded to each other. At this time, the metal powder 12 melted with the laser is a molten solidified body. The particles of the metal powder 12 are formed in non-spherical shapes through the melting. In other words, the electronic component of the present embodiment includes the molten solidified body at least containing Fe. The molten solidified body is on the outer surface of the body 10 and is in contact with the outer electrodes 30. The contact areas Z are a laser irradiation face.

Figure 6:
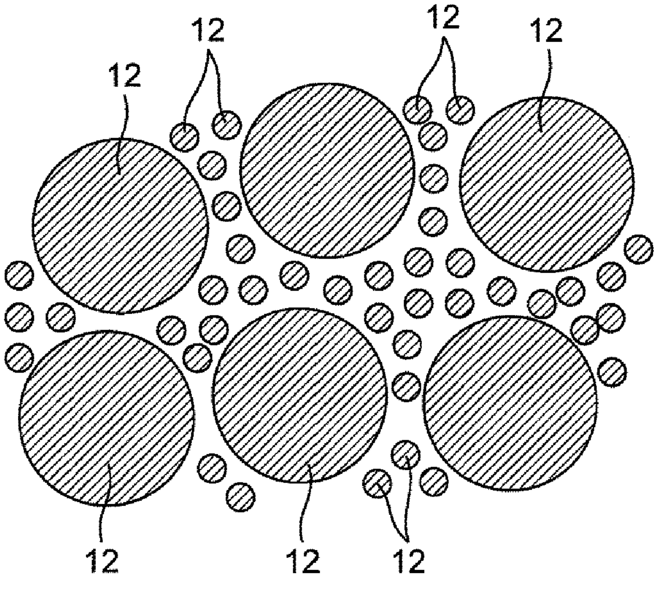
FIG. 6 is a cross-sectional view illustrating the state of the metal powder in the body.

FIG. 6 is a cross-sectional view illustrating the state of the metal powder in the body 10. As illustrated in FIG. 6, the adjacent particles of the metal powder 12 are separated from each other and are not in contact with each other in the body 10. The particles of the metal powder 12 has spherical shapes. In other words, the metal powder 12 is less affected by the heat generated by the irradiation of the laser and is difficult to deform in the body 10. The percentage of the contact of the particles of the metal powder 12 in the body 10 per unit cross-section area (refer to FIG. 6) is lower than the percentage of the contact of the particles of the metal powder 12 in the contact areas Z on the outer surface of the body 10 per unit cross-section area (refer to FIG. 5). The cross-section area is a cross section in a planar direction. The particles of the metal powder 12 may be in contact with each other in the body 10.

It is preferred that the particle size distribution of the metal powder 12 have multiple peak positions and the particles of the metal powder 12, which are in contact with each other, (that is, the network structure) exist in an area up to a depth corresponding to twice of the maximum peak position, among the multiple peak positions, from the outer surface of the body 10. Specifically, when the maximum peak position in the particle size distribution of the metal powder 12 is at 50 μm, the particles of the metal powder 12, which are in contact with each other, exist in an area up to a depth of 100 μm from the outer surface of the body 10. The particle size distribution is measured using a laser diffraction particle-size-distribution measuring device.

In addition, the ratio of the exposure area of the metal powder 12 to the area of the contact areas Z on the outer surface of the body 10 is preferably 30% or more. The area is measured by binarizing the area of the metal powder and the area of the resin using the difference in contrast between a backscattered electron image of a light element and a backscattered electron image of a heavy element with an electron microscope.

A method of manufacturing the coil component 1 will now be described.

First, the coil conductor 20 is provided in the body 10. Specifically, the following methods are used. In one method, after coil conductor paste and paste containing metal magnetic powder are formed using screen printing or the like and sequential printing lamination is repeated to produce a block body, the block body is divided into individual coil conductors to produce a fired body. In another method, the coil conductor is embedded in a core (body) resulting from molding of metal magnetic powder. In another method, after the multiple coil conductors are arranged, the arranged coil conductors are collectively embedded in a sheet containing metal magnetic powder, and the sheet is hardened, for example, the sheet is cut into individual coil conductors with a dicing machine. In any of these methods, a structure is adopted in which the entire body is covered with a mixture of metal magnetic powder and resin or a sintered body made of metal magnetic powder and the end portions of the coil are exposed on the end faces.

Figure 7:
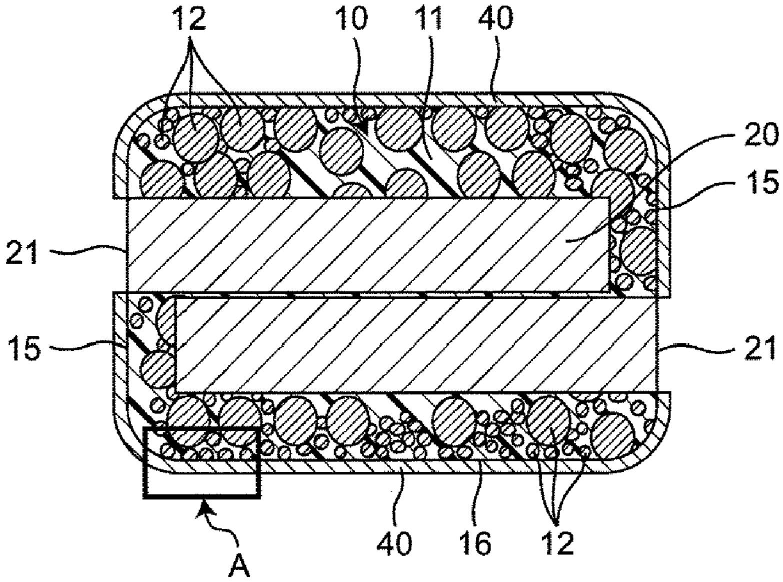
FIG. 7 is a diagram for describing a method of manufacturing the coil component.
Figure 8:
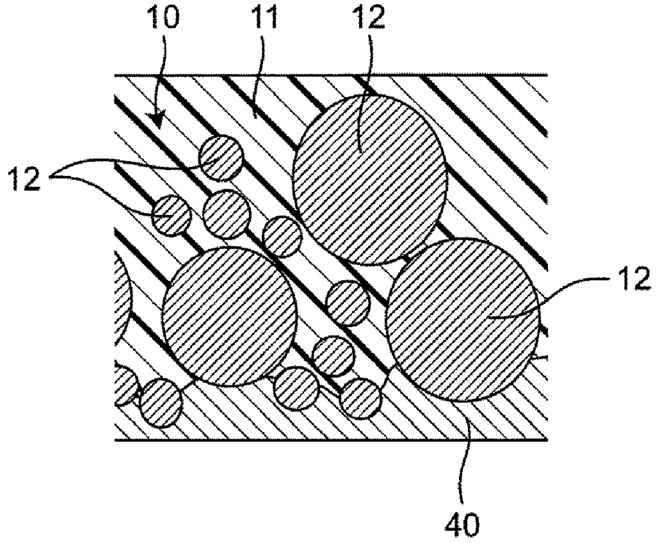
FIG. 8 is an enlarged view of an A portion in FIG. 7.

Then, as illustrated in FIG. 7, the coil conductor 20 is provided in the body 10 so that the end portions 21 of the coil conductor 20 are exposed on the end faces 15 of the body 10, and the insulating film 40 is provided on the outer surface of the body 10, excluding the end portions 21 of the coil conductor 20. At this time, as illustrated in FIG. 8, which is an enlarged view of an A portion in FIG. 7, although part of the metal powder 12 escapes from the resin material 11 because the outer surface of the body 10 is cut out, part of the metal powder 12 is covered with the insulating film 40.

Figure 9:
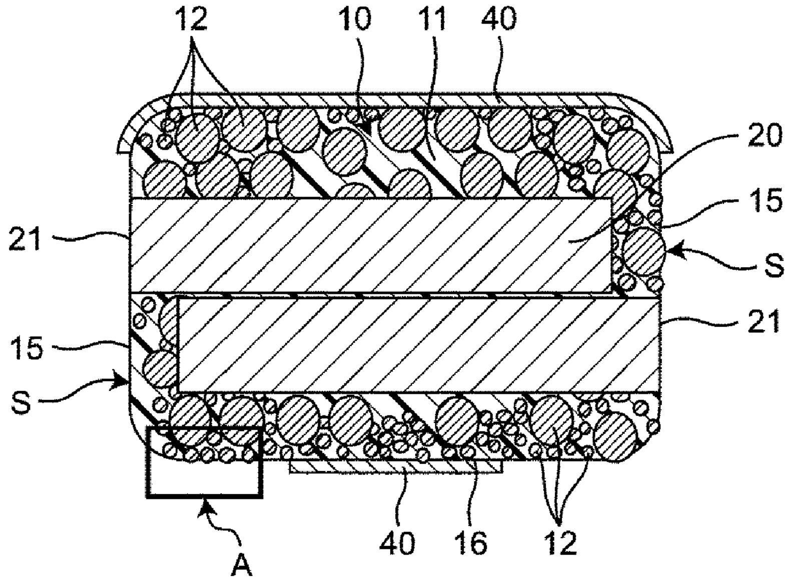
FIG. 9 is a diagram for describing the method of manufacturing the coil component.
Figure 10:
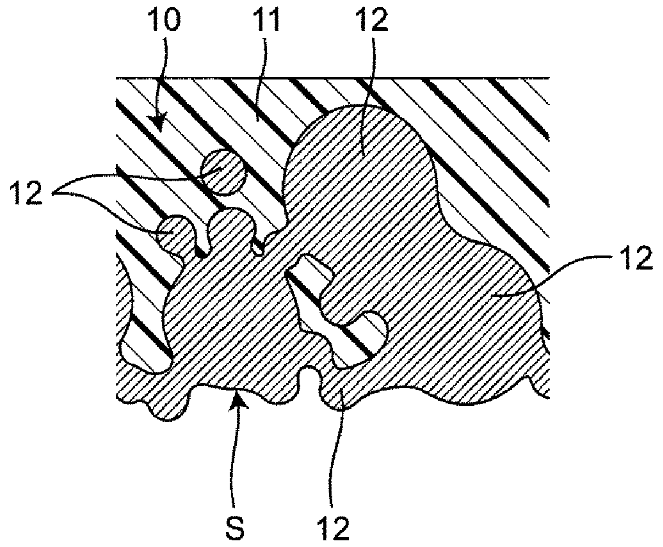
FIG. 10 is an enlarged view of an A portion in FIG. 9.

Then, as illustrated in FIG. 9, areas on the outer surface of the body 10, where the outer electrodes 30 are to be formed, are irradiated with the laser. Specifically, a laser irradiation face S is provided on both end faces 15 of the body, one end face 15 side of the first side face 16 of the body, and the other end face 15 side of the first side face 16 of the body. At this time, as illustrated in FIG. 10, which is an enlarged view of an A portion in FIG. 9, the multiple particles in the metal powder 12 are caused to escape from the resin material 11 on the laser irradiation face S of the body 10 and at least partial portions of the escaping metal powder 12 (that is, the multiple particles) are caused to be in contact with each other. Specifically, the body 10 is irradiated with the laser so that the partial portions of the metal powder 12 of the body escape from the resin material and are in contact with each other. This is referred to as a laser irradiating process. In other words, the insulating film 40 and the resin material 11 are removed by the irradiation of the laser to cause the metal powder 12 to escape from the resin material 11. At least partial portions of the metal powder 12, which are in contact with each other, are melted with the laser to be bonded to each other. The wavelength of the laser is, for example, 180 nm to 3,000 nm. The wavelength of the laser is more preferably 532 nm to 1,064 nm. When the wavelength of the laser is within this range, it is possible to melt the metal powder and to suppress a damage on the body due to the irradiation of the laser. The wavelength of the laser is set in consideration of the damage on the body 10 and reduction in the processing time. The irradiation energy of the laser is preferably within a range from 1 $W/mm^2$ to 30 $W/mm^2$ and is more preferably within a range from 5 $W/mm^2$ to 12 $W/mm^2$.

As described above, since the insulating film 40 is removed from the areas (hereinafter referred to as laser irradiated areas) where the irradiation of the laser has been performed, the laser irradiated areas are capable of being defined as areas surrounded by the insulating film 40 in the electronic component including the insulating film 40. In other words, the laser irradiated areas are exposure areas where the body is exposed on the insulating film 40. The laser irradiated areas are the areas where the outer electrodes 30 are formed on the body 10 on the laser irradiation face. These areas are preferably irradiated with the laser after the areas in which the outer electrodes 30 are to be formed (that is, the laser irradiated areas) are surrounded by ultraviolet absorbing resin. This suppresses the influence of the laser on the portion other than the areas where the outer electrodes 30 are to be formed to selectively form the outer electrodes 30. The ultraviolet absorbing resin may be appropriately changed to resin absorbing other light depending on the waveform of the irradiating laser.

After the laser irradiating process, as illustrated in FIG. 3 and FIG. 4, the outer electrodes 30 (the metal film) are formed on the laser irradiation face S of the body 10 using the plating. This is referred to as a metal film forming process. Specifically, one outer electrode 30 is continuously provided on one end face 15 and one end face 15 side of the first side face 16 and the other outer electrode 30 is continuously provided on the other end face 15 and the other end face 15 side of the first side face 16.

In application of electrolytic plating or non-electrolytic plating to the body 10, the plating is precipitated from the particles of the metal powder 12, which have escaped, have been melted, and have been bonded to each other, and the plating is sequentially formed so as to cover the entire laser irradiation face S to form the L-shaped outer electrodes 30. At this time, after application of the plating catalyst to the laser irradiation face S of the body 10, the metal film may be formed using the plating. This improves the productivity of the plating. The plating catalyst in the present embodiment is metal that improves the growth rate of the plating. The plating catalyst contains, for example, metal solution, or nano-scaled metal powder or metal complex. The kind of the plating metal may be, for example, Pd, Ag, or Cu.

With the coil component 1, the outer electrodes 30 are capable of being formed on the side face 16 without embedding the conductor conducting to the side face 16 (the bottom face) adjacent to the end faces 15 in the body 10 and the body 10 is capable of being increased in size by an amount corresponding to the conductor to improve the efficiency of acquisition of the inductance. The method of forming the body 10 and the coil conductor 20 is not limited to the laminating method and another method is applicable to the outer electrodes of the coil component including the winding coil.

The multiple particles of the metal powder 12 escape from the resin material 11 and at least partial portions (the multiple particles) of the escaping metal powder 12 are in contact with each other. In other words, the particles have the network structure having the connectivity. Accordingly, in the formation of the outer electrodes 30 through the direct plating on the body 10, current is easy to flow because of the network structure of the metal powder 12 and the precipitation speed of the plating is increased to facilitate the formation of the outer electrodes 30.

In contrast, with no network structure of the metal powder, there is a problem in that the plating rate is extremely decreased due to insufficient power supply even when the electrolytic plating is applied to the body. In addition, the plating film (the metal film) having a sufficient film thickness is not capable of being formed even when the non-electrolytic plating is applied to the body by adding catalyst, such as palladium.

In particular, when cutting and/or barrel finishing is performed before the plating process in the electrolytic plating, the particles of the metal powder are dropped off and the power supply points is run short. As a result, the plating film is difficult to precipitate to greatly decrease the plating rate. Since the metal powder is easily separated from the resin material due to the cutting and/or the barrel finishing, there is a problem in that the adhesion strength of the plating film to the body is decreased.

With the coil component 1, at least partial portions of the metal powder 12, which are in contact with each other, are bonded to each other through, for example, the melting. Accordingly, the network structure of the metal powder 12 is made strong to further facilitate the formation of the outer electrodes 30.

With the coil component 1, one outer electrode 30 is continuously provided on one end face 15 and one end face 15 side of the first side face 16 and the other outer electrode 30 is continuously provided on the other end face 15 and the other end face 15 side of the first side face 16. As described above, it is not necessary to embed the outer electrodes 30 in the body 10 even when the outer electrodes 30 are formed in L shapes to improve the efficiency of acquisition of the inductance.

Since the outer electrodes 30 are formed in L shapes, the end portions 21 of the coil conductor 20 are capable of being connected to the outer electrodes 30 on the end faces 15 even when the winding coil is used as the coil conductor 20. In contrast, if the outer electrodes 30 are not provided on the end faces 15 and the outer electrode 30 is provided only on the first side face 16, it is necessary to lead the end portions of the winding coil from the end faces 15 to the first side face 16 to require a complicated bending process.

With the coil component 1, since the percentage of the contact of the particles of the metal powder 12 in the body 10 is lower than the percentage of the contact of the particles of the metal powder 12 on the outer surface of the body 10, it is possible to keep the insulation in the body 10 to improve voltage resistance.

With the coil component 1, since the insulating film 40 is provided on the outer surface in the portions where the outer electrodes 30 are not disposed, it is possible to ensure the insulation of the coil component 1. In addition, the outer electrodes 30 are capable of being formed by using the insulating film 40 as a mask.

With the coil component 1, since the metal powder 12 contains at least one of the metals: Pd, Ag, and Cu, it is possible to use at least of the metals as the plating catalyst to improve the productivity of the plating. The particle size distribution of Fe or alloy powder containing Fe in the metal powder 12 may have multiple peak positions. In this case, it is possible to improve the filling rate of Fe or the alloy powder containing Fe in the body 10 to improve the permeability.

With the coil component 1, since the particles of the metal powder 12, which are in contact with each other, exist in an area up to a depth corresponding to twice of the maximum peak position in the particle size distribution of the metal powder 12 from the outer surface of the body 10, it is possible to improve the voltage resistance by keeping the insulation in the body 10 while providing the conductivity on the outer surface of the body 10. With the coil component 1, since the particles of the metal powder 12, which are in contact with each other, exist in an area up to a depth of 100 μm from the outer surface of the body 10, it is possible to ensure the conductivity on the outer surface of the body 10 and the insulation in the body 10. With the coil component 1, since the ratio of the exposure area of the metal powder 12 to the area of the contact areas Z on the outer surface of the body 10 is 30% or more, it is possible to ensure the conductivity of the outer surface of the body 10.

With the method of manufacturing the coil component 1, since the outer electrodes 30 are formed on the laser irradiation face S of the body 10 using the plating, the outer electrodes 30 are not embedded in the body 10 and the body 10 is increased in size by an amount corresponding to the outer electrodes 30 to improve the efficiency of acquisition of the inductance. Since the outer surface of the body 10 is irradiated with the laser, the multiple particles of the metal powder 12 escape from the resin material 11, and at least partial portions of the escaping metal powder 12 are caused to be in contact with each other, at least partial portions of the escaping metal powder 12 have the network structure having the connectivity. Accordingly, in the formation of the outer electrodes 30 through the direct plating on the body 10, current is easy to flow because of the network structure of the metal powder 12 and the precipitation speed of the plating is increased to facilitate the formation of the outer electrodes 30.

In particular, the use of the laser enables the outer electrodes 30 having desired shapes to be formed. In addition, with the use of the laser, it is possible to perform partial fusion bonding of the metal powder 12, to melt the surface of the metal powder 12 to make the surface uneven, and to selectively remove only the insulating film on the surface. Furthermore, it is possible to provide the plating film in the depressions on the surface of the metal powder 12 to improve the anchor effect of the plating film.

With the method of manufacturing the coil component 1, in the metal film forming process, one outer electrode 30 is continuously provided on one end face 15 and one end face 15 side of the first side face 16 and the other outer electrode 30 is continuously provided on the other end face 15 and the other end face 15 side of the first side face 16. Even when the outer electrodes 30 are formed in L shapes in the above manner, it is not necessary to embed the outer electrodes 30 in the body 10 to improve the efficiency of acquisition of the inductance.

Second Embodiment

Figure 11:
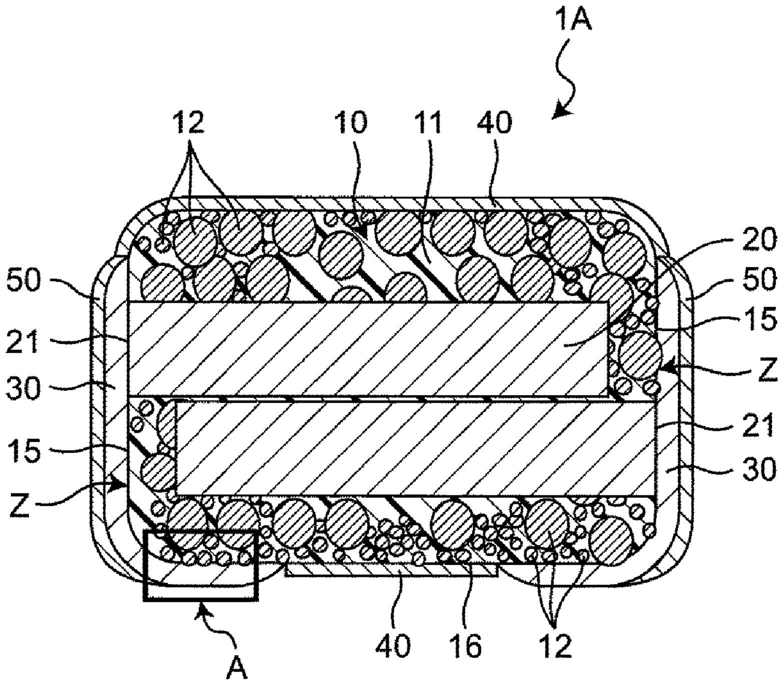
FIG. 11 is a perspective view illustrating a second embodiment of a coil component of the present disclosure.

FIG. 11 is a perspective view illustrating a second embodiment of a coil component of the present disclosure. The second embodiment differs from the first embodiment in the shapes of the outer electrodes (the metal film). Only the components different from those in the first embodiment will be described here. The same reference numerals are used in the second embodiment to identify the same components in the first embodiment. A description of such components is omitted herein.

As illustrated in FIG. 11, in a coil component 1A of the second embodiment, portions of the outer electrodes 30, which are positioned on the end faces 15, are covered with an insulating film 50. The insulating film 50 is made of, for example, a resin material. Only portions of the outer electrodes 30, which are positioned on the first side face 16, are exposed to the outside. In other words, the outer electrodes 30 are used as bottom electrodes. Accordingly, the outer electrodes 30 are varied from the L-shaped electrodes to the bottom electrodes with a simple configuration. In addition, the insulating film 50 is provided on the end faces 15 side of the coil component 1A. Accordingly, even when multiple coil components 1A are disposed so as to be close to each other, the adjacent coil components 1A are not short-circuited.

A method of manufacturing the coil component 1A will now be described.

After the metal film forming process in the method of manufacturing the coil component 1 in the first embodiment described above, the portions of the outer electrodes 30, which are positioned on the end faces 15, are covered with the insulating film 50. This is referred to as an insulating film forming process. The outer electrodes 30 are covered using, for example, a spray method or a dipping method. This enables the outer electrodes 30 to be used as the bottom electrodes.

If the covering with the insulating film for the formation of the bottom electrodes is finally performed when the outer electrode 30 is composed of three layers: a metal film, an Ni plating layer, and an Sn plating layer, solder may wrap around to the end portions of the Sn plating layer between the insulating film and the Sn plating layer in mounting on a substrate to damage the insulating film. Accordingly, it is desirable that, after the L-shaped electrodes are formed with the metal film, the bottom electrodes are formed through the covering with the insulating film and, then, the Ni plating layer and the Sn plating layer are formed only on the bottom face.

The present disclosure is not limited to the above embodiments and modifications may be made without departing from the true spirit and scope of the present disclosure.

Although the L-shaped electrodes and the bottom electrodes are used as examples of the metal film in the above embodiments, for example, a U-shaped electrode or an end-face electrode may be used as the metal film.

EXAMPLES

Examples of the first embodiment will now be described. As illustrated in FIG. 9, the portions where the outer electrodes 30 are to be formed were irradiated with $YVO_4$ laser having a wavelength of 1,064 nm. The irradiation energy was set to 5 W/mm$^2$ and 12 W/mm$^2$. Then, a backscattered electron image of the portions irradiated with the laser was captured under four conditions of acceleration voltage of 10 kV, emission current of 40 μA, WD 10 mm, and an objective movable aperture using SU-1510 manufactured by Hitachi High-Technologies Corporation. The portion of the metal powder and the remaining portion in the captured image were binarized through image processing to calculate the percentage of the area of the metal powder (exposure percentage of the metal). The exposure percentage of the metal is defined as the percentage of the exposure of the metal powder in the laser irradiated area. Then, Cu plating was applied using electrolytic barrel plating under conditions of a current value of 15 A, a temperature of 55° C., and a plating time of 180 minutes to form the outer electrodes.

Next, the number of chips to which the plating is not bonded was counted from the appearance. The chips to which the plating is not bonded by 50% or more in the portion irradiated with the laser (that is, the laser irradiated area) was determined to be counted as the number of chips to which the plating is not bonded. The inductance was measured to count the number of chips in which a reduction in the L value occurs at 10 MHz.

Table 1 indicates the result of the above experiment.

TABLE 1

| Laser energy (W/mm$^2$) | Exposure percentage of metal (%) | Plating is not bonded (number of chips) | Reduction in L value (number of chips) | Film formation rate (nm/min) |
|---|---|---|---|---|
| None | 59 | 50/100 | 0/100 | 1 |
| 5 | 61 | 0/100 | 0/100 | 37 |
| 12 | 72 | 0/100 | 0/100 | 56 |

As indicated in Table 1, when the irradiation energy of the laser was 0 W/mm$^2$, the exposure percentage of the metal was 59%, the number of chips to which the plating is not bonded was 50/100, the number of chips in which the reduction in the L value occurs was 0/100, and the film formation rate was 1 nm/min. The film formation rate was measured through cross section polishing. The film formation rate was calculated by measuring the thicknesses of five points and dividing the average of the thicknesses by the plating time.

When the irradiation energy of the laser was 5 W/mm$^2$, the exposure percentage of the metal was 61%, the number of chips to which the plating is not bonded was 0/100, the number of chips in which the reduction in the L value occurs was 0/100, and the film formation rate was 37 nm/min.

When the irradiation energy of the laser was 12 W/mm$^2$, the exposure percentage of the metal was 72%, the number of chips to which the plating is not bonded was 0/100, the number of chips in which the reduction in the L value occurs was 0/100, and the film formation rate was 56 nm/min.

As indicated in Table 1, with no irradiation with the laser, almost no plating was formed. In contrast, with the irradiation with the laser to compose the network structure, the film formation rate was increased and there was no chip where the plating is not bonded. In addition, the reduction in the L value of the chip did not occur. It was found that the film formation rate is increased as the irradiation energy of the laser is increased.

Figure 12A:
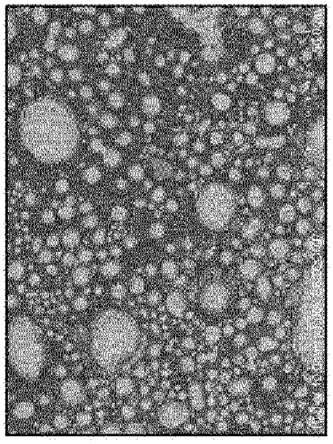
FIGS. 12A through 12C include diagrams illustrating images of the surface of the body with the irradiation with laser and with no irradiation with the laser.
Figure 12B:
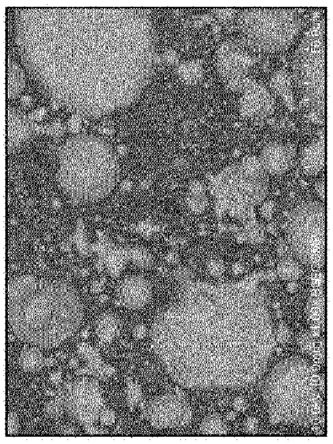
Figure 12C:
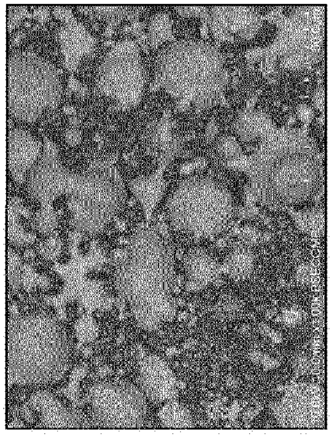

FIGS. 12A through 12C include diagrams illustrating images of the surface of the body with the irradiation with the laser and with no irradiation with the laser. White portions indicate the metal powder in FIGS. 12A through 12C. FIG. 12A illustrates a case in which the irradiation with the laser was not performed. In this case, the network structure of the metal powder was not formed. FIG. 12B illustrates a case in which the irradiation energy of the laser was 5 W/mm$^2$. In this case, the network structure of the metal powder was formed. FIG. 12C illustrates a case in which the irradiation energy of the laser was 12 W/mm$^2$. In this case, the network structure of the metal powder was sufficiently formed.

From the above result, it is considered that a state was made in which the network structure of the metal powder is formed through the irradiation of the laser and current easily flows.

It is considered that adhesion of palladium solution as preprocessing of the plating further increases the growth rate of the plating. The palladium solution is capable of being applied using, for example, an inkjet method. In this case, the metal powder composing the network structure contains Pd, in addition to the metal magnetic particles containing Fe. In addition, it is considered that dipping the chips in ink containing Cu or Ag having low resistivity and partially sandwiching the chips in the network structure further increase the effect. In this case, it is more preferable to use nano-scaled metal powder or metal complex.

What is claimed is:

1. A method of manufacturing a coil component, the method comprising:

providing a coil conductor in a body made of a composite material containing a resin material and metal powder so that an end portion of the coil conductor is exposed on an end face of the body;

irradiating at least the end face in an outer surface of the body with laser in such a manner to cause particles of the metal powder to be exposed from the resin material on a laser irradiation face of the body and to cause the particles to be in contact with each other; and forming a metal film on the laser irradiation face of the body using plating, wherein:

the body has a side face adjacent to the end face, the laser irradiation face is provided on the end face and the side face during the laser irradiating, and the metal film is continuously provided on the end face and the side face in the metal film forming.

2. The method of manufacturing the coil component according to claim 1, further comprising:

covering a portion of the metal film, which is positioned on the end face, with an insulating film after the metal film forming step.

3. The method of manufacturing the coil component according to claim 1, wherein during the laser irradiating, the laser is irradiated to melt the particles so that the particles are bonded to each other.

* * * * *